US010091701B1

United States Patent
Sharma et al.

(10) Patent No.: US 10,091,701 B1
(45) Date of Patent: Oct. 2, 2018

(54) INFORMATION CENTRIC NETWORK (ICN) WITH CONTENT AWARE ROUTERS (CARS) TO FACILITATE A USER EQUIPMENT (UE) HANDOVER

(71) Applicant: Sprint Communications Company L.P., Overland Park, KS (US)

(72) Inventors: Ankur Sharma, Plano, TX (US); Yu Zhou, Herndon, VA (US); Noman Muzaffar Alam, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/609,812

(22) Filed: May 31, 2017

(51) Int. Cl.
| | | |
|---|---|---|
| *H04W 36/00* | (2009.01) | |
| *H04W 36/38* | (2009.01) | |
| *H04W 40/36* | (2009.01) | |
| *H04L 12/725* | (2013.01) | |
| *H04W 76/02* | (2009.01) | |
| *H04L 12/801* | (2013.01) | |
| *H04W 8/26* | (2009.01) | |
| *H04W 76/11* | (2018.01) | |
| *H04W 92/20* | (2009.01) | |

(52) U.S. Cl.
CPC ........... *H04W 36/38* (2013.01); *H04L 45/306* (2013.01); *H04L 47/34* (2013.01); *H04W 8/26* (2013.01); *H04W 40/36* (2013.01); *H04W 76/021* (2013.01); *H04W 76/11* (2018.02); *H04W 92/20* (2013.01)

(58) Field of Classification Search
CPC ....................................... H04W 36/00–36/385
See application file for complete search history.

(56) References Cited

U.S. PATENT DOCUMENTS

| | | | |
|---|---|---|---|
| 9,049,251 B2 | 6/2015 | Ravindran et al. | |
| 9,288,141 B2 | 3/2016 | Callan et al. | |
| 9,426,113 B2 | 8/2016 | Mahadevan et al. | |
| 2008/0248815 A1 | 10/2008 | Busch | |
| 2013/0016695 A1* | 1/2013 | Ravindran | H04L 67/327 370/331 |
| 2013/0039249 A1* | 2/2013 | Ravindran | H04W 76/002 370/312 |
| 2013/0227166 A1* | 8/2013 | Ravindran | H04L 67/327 709/238 |
| 2013/0235845 A1 | 9/2013 | Kovvali et al. | |
| 2013/0329696 A1* | 12/2013 | Xu | H04W 36/023 370/331 |
| 2014/0031043 A1* | 1/2014 | Holma | H04W 36/08 455/438 |
| 2014/0064249 A1* | 3/2014 | Lee | H04W 36/023 370/331 |
| 2014/0192717 A1 | 7/2014 | Liu et al. | |
| 2015/0327142 A1* | 11/2015 | Martinez Tarradell | H04W 24/10 455/436 |

(Continued)

*Primary Examiner* — German Viana Di Prisco

(57) ABSTRACT

A wireless communication system includes a plurality of Content Aware Routers (CARs) to facilitate a User Equipment (UE) handover. A source CAR exchanges communication data with a UE over a source wireless access point using Information Centric Network (ICN) routing. A target CAR receives a notification of the UE handover, requests the communication data for the UE, and receives subsequent data communication for the UE. The target CAR exchanges communication data with the UE over a target wireless access point using ICN routing.

6 Claims, 6 Drawing Sheets

(56) References Cited

U.S. PATENT DOCUMENTS

| | | | |
|---|---|---|---|
| 2016/0100350 A1 | 4/2016 | Laraqui et al. | |
| 2016/0192261 A1* | 6/2016 | Wang | H04W 36/0055 370/331 |
| 2016/0366620 A1* | 12/2016 | Royon | H04L 67/10 |
| 2017/0257802 A1* | 9/2017 | Roeland | H04W 36/0033 |
| 2017/0257904 A1* | 9/2017 | Mildh | H04W 76/04 |

* cited by examiner

INFORMATION CENTRIC NETWORK (ICN) WITH CONTENT AWARE ROUTERS (CARS) TO FACILITATE A USER EQUIPMENT (UE) HANDOVER

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

Information Centric Network (ICN) based routing allows each request from a user to be delivered in the form of a content where each content has a name with a special format with inbuilt security and capable of "in-network" caching. By naming the content rather than the content host or content interface, the content location may be independent of the devices that store the content. Advantageously, this allows subscribers to receive the content and publishers to deliver the content without knowledge of where the other is located.

Although ICN allows content forwarding between subscribers and publishers, mobility management for both subscribers and publishers is limited. Content Aware Routers (CARs) are used to route content between a network of publishers and subscribers. ICN typically requires that a UE handing over between wireless access points to inform the new wireless access point of information elements in a special notification message after the handover has occurred. During high rates of mobility or when both subscribers and publishers are moving, the frequency of updates increases. This may lead to an increased delay resulting from the special notification message delivered after the handover has occurred and then the UE initiation of a new request. Therefore, current methods for handing over a UE using ICN based routing during times of high mobility are neither efficient nor effective.

TECHNICAL OVERVIEW

A wireless communication system includes a plurality of Content Aware Routers (CARs) to facilitate a User Equipment (UE) handover. A source CAR exchanges communication data with a UE over a source wireless access point using Information Centric Network (ICN) routing. A target CAR receives a notification of the UE handover, requests the communication data for the UE, and receives subsequent data communication for the UE. The target CAR exchanges communication data with the UE over a target wireless access point using ICN routing.

DETAILED DESCRIPTION

Figure 1:
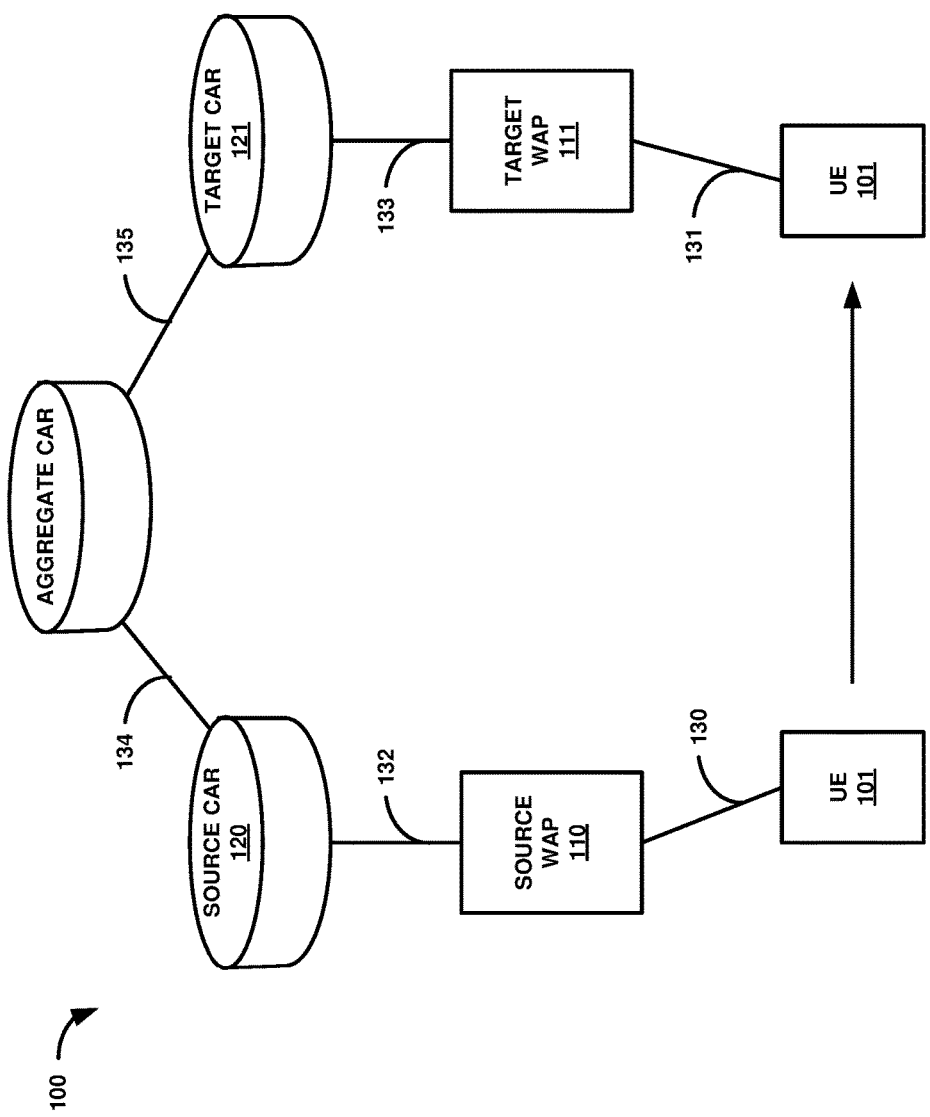
FIGS. 1-2 illustrate a wireless communication system including a plurality of Content Aware Routers (CARs) to facilitate a User Equipment (UE) handover.
Figure 2:
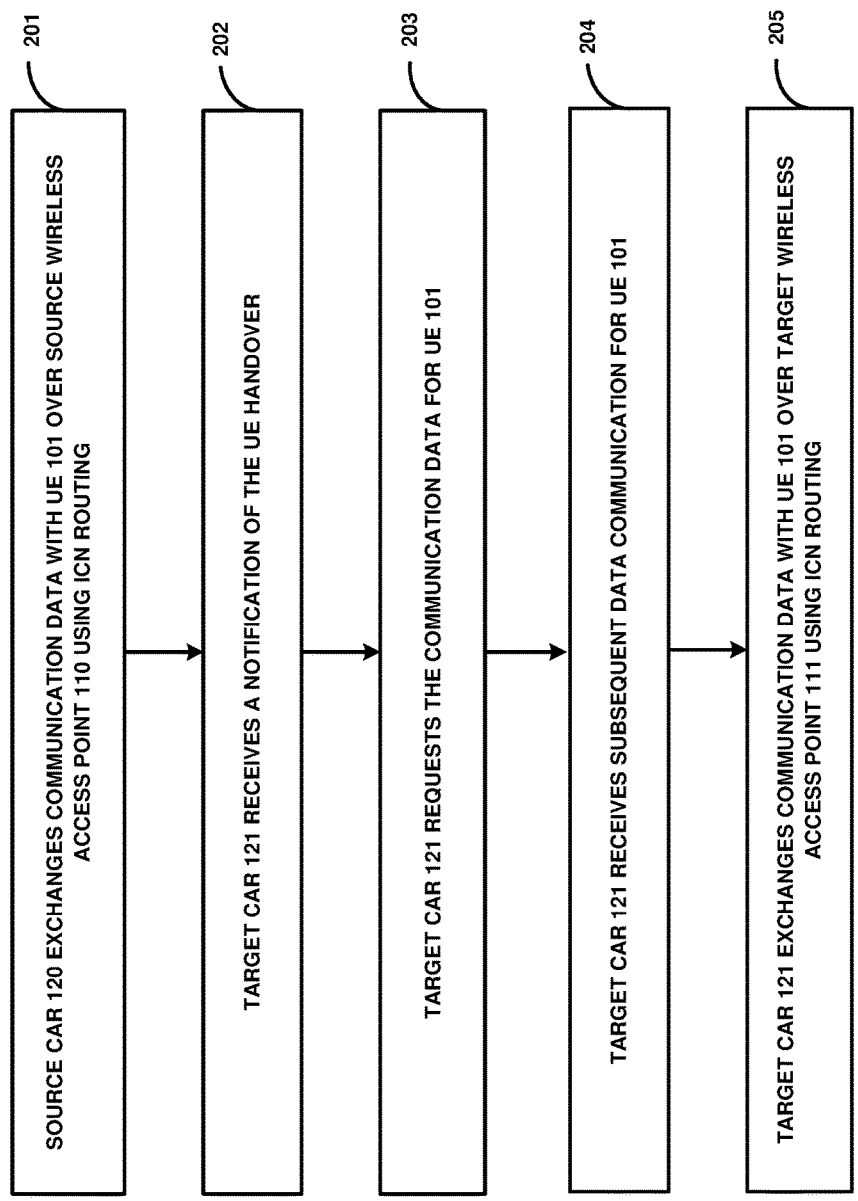

FIGS. 1-2 illustrate a wireless communication system including a plurality of Content Aware Routers (CARs) to facilitate a User Equipment (UE) handover. Referring to FIG. 1, wireless communication system 100 comprises UE 101, source wireless access point 110, target wireless access point 111, source CAR 120, target CAR 121, and an aggregate CAR. As indicated by the arrow, UE 101 moves from an access area served by source wireless access point 110 to an access area served by target wireless access point 111.

UE 101 communicates with source wireless access point 110 and target wireless access point 111 over wireless links 130-131. Source wireless access point 110 communicates with source CAR 120 over communication link 132. Target wireless access point 111 communicates with target CAR 121 over communication link 133. Source CAR 120 and target CAR 121 communication with the aggregate CAR over communication links 134-135.

UE 101 could be a phone, tablet computer, media device, an intelligent machine, or some other apparatus having a wireless transceiver. UE 101 includes processing circuitry and memory that store and execute various software modules. UE 101 may wirelessly receive and transmit Radio Resource Control (RRC) signaling to attach, request services, and exchange data with source CAR 120 over source wireless access point 110 and target CAR 121 over target wireless access point 111 using Information Centric Network (ICN) based routing.

Source wireless access point 110 and target wireless access point 111 may each comprise a macro base station, a micro base station, an evolved NodeB (eNodeB), or some other wireless access point that may provide wireless communication services to UE 101. Source wireless access point 110 and target wireless access point 111 include communication transceivers comprising antennas, amplifiers, modulators, filers, and digital signal processors. Source wireless access point 110 and target wireless access point 111 also include data processing circuitry, memory, and operating software to control the transceivers and server network applications. Source wireless access point 110 may handoff UE 101 to target wireless access point 111.

Source CAR 120 and target CAR 121 are used to route content between a network of publishers and subscribers, such as UE 101. Source CAR 120 and target CAR 121 comprise content delivery interface transceivers, Internet Protocol (IP) routers, media servers, content delivery interface controllers, databases, data processors, and/or some other content delivery network elements. In some examples, source CAR 120 and target CAR 121 each comprise a Software-Defined Network (SDN) data plane machine.

Wireless communication links 130-131 use air or space as the transport media. Wireless communication links 130-131 may use various protocols, such as Long Term Evolution (LTE), Code Division Multiple Access (CDMA), Orthogonal Frequency Division Multiplexing Access (OFDMA), LTE Wireless Aggregation (LWA), IP, Evolution Data Only (EVDO), Worldwide Interoperability for Microwave Access (WIMAX), Global System for Mobile Communication (GSM), High Speed Packet Access (HSPA), or some other wireless communication format—including combinations thereof.

Communication links 132-135 may use various protocols, such as Real Time Protocol (RTP), Real Time Streaming Protocol (RTSP), Real Time Control Protocol (RTCP), multipath RTP (mRTP), LTE, enhanced Multimedia Broadcast Multicast Service (eMBMS), LTE Local IP Access (LIPA), File Transfer over Unidirectional Transport (FLUTE), FLUTE over eMBMS, Ethernet, Wireless Fidelity (Wifi), universal Plug and Play (uPnP), or some other data communication system—including combinations thereof.

In operation, source CAR 120 exchanges communication data with UE 101 over source wireless access point 110 using ICN routing. Communication data typically includes data for media communications such as, internet access, voice calls, media streaming, user messaging, among other communication services. ICN based routing allows each request from a user to be delivered in the form of a content where each content has a name with a special format with inbuilt security and capable of "in-network" caching. By naming the content rather than the content host or content interface, the content location may be independent of the devices that store the content which allows subscribers to receive the content and publishers to deliver the content without knowledge of where the other is located.

Target CAR 121 receives a notification of the UE handover. Target CAR 121 may receive the notification from target wireless access point 111, source CAR 120, the aggregate CAR or some other control element. The notification may include a source CAR identifier, a source wireless access point identifier, and a UE identifier. The notification may also include other information elements, such as sequence number of the last packet received by UE 101, a content name, a prefix for UE 101, and a UE IP address.

Target CAR 121 requests and receives the communication data for UE 101. Target CAR 121 may request and receive subsequent communication data by querying an internal data structure to determine source CAR 120 and requesting the data from the aggregate CAR or source CAR 120 based on an identifier for source wireless access point 110 and an identifier for UE 101. Target CAR 121 may also request and receive subsequent communication data by receiving a notification from the aggregate CAR where the aggregate CAR determines target CAR 121 based on an identifier for target wireless access point 111 and an identifier for UE 101 received from source CAR 120.

In some examples, target CAR 121 may request and receive subsequent communication data by receiving an identifier for source CAR 120 from source wireless access point 110 and target wireless access point 111 over an X2 interface link or an S1 interface link. Target CAR 121 may then request and receive the communication data from the aggregate CAR based on the identifier for source CAR 120 and the identifier for UE 101. Target CAR 121 may also receive forwarded communication data from source CAR 120 over wireless access points 110-111 using the X2 interface or the S1 interface.

Target CAR 121 then exchanges communication data with UE 101 over target wireless access point 111 using ICN routing. Advantageously, during high rates of mobility or when both subscribers and publishers are moving, delay may be decreased since the notification message is delivered during the UE handover and UE 101 does not need to initiate a new request to target CAR 121 over target wireless access point 111.

FIG. 2 is a flow diagram illustrating an operation of a wireless communication system including a plurality of CARs to facilitate a UE handover. Source CAR 120 exchanges (201) communication data with UE 101 over source wireless access point 110 using ICN routing. Target CAR 121 receives (202) a notification of the UE handover. Target CAR 121 requests (203) the communication data for UE 101. Target CAR 121 receives (204) subsequent data communication for UE 101. Target CAR 121 exchanges (205) communication data with UE 101 over target wireless access point 111 using ICN routing.

Figure 3:
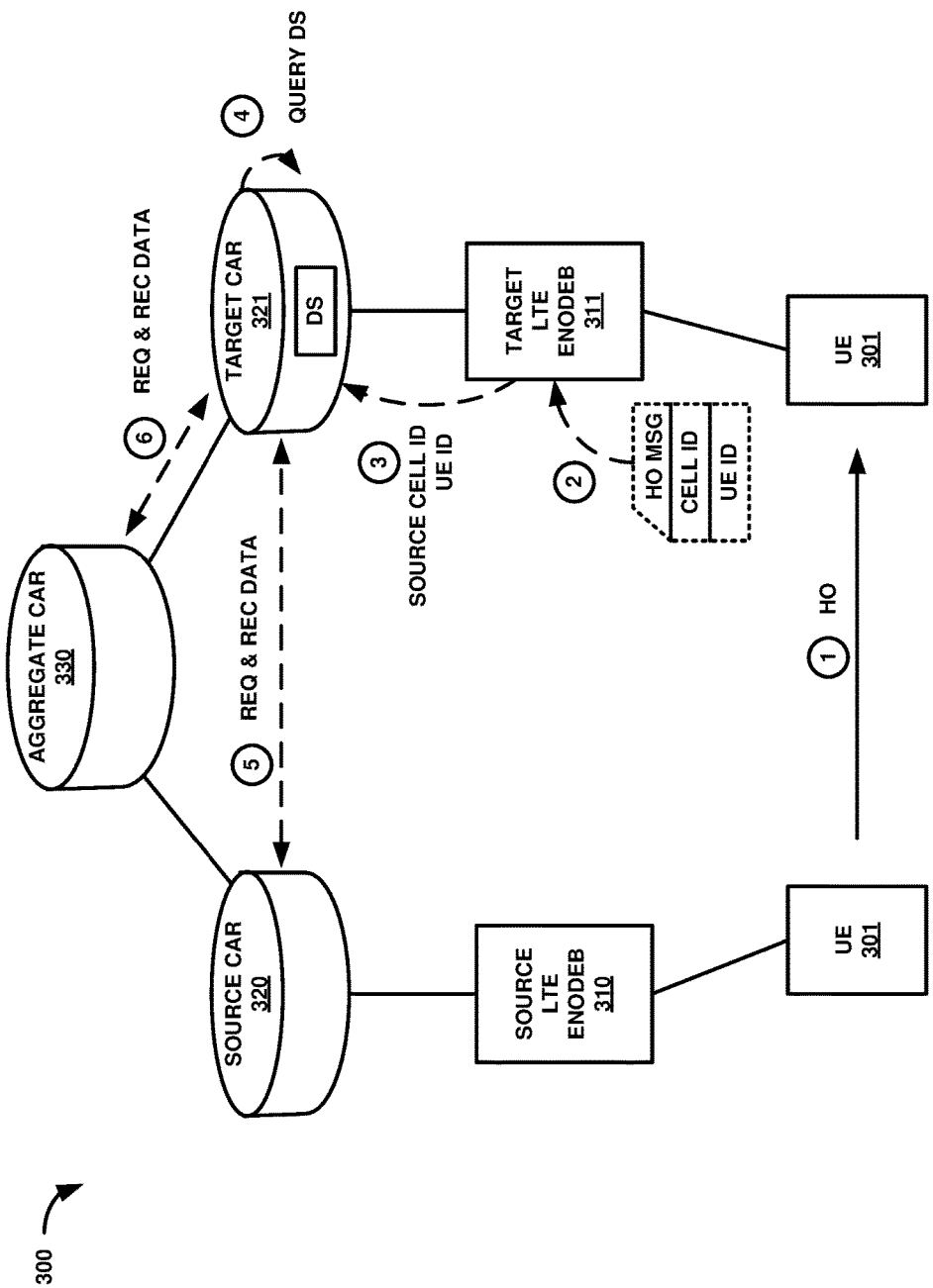
FIG. 3 illustrates a Long Term Evolution (LTE) communication system including a plurality of CARs to facilitate a UE handover.

FIG. 3 illustrates Long Term Evolution (LTE) communication system 300 including a plurality of CARs to facilitate a UE handover. LTE communication system 300 is an example of wireless communication system 100, although wireless communication system 100 may use alternative configurations and operations. LTE communication system 300 comprises UE 301, source LTE eNodeB 310, target LTE eNodeB 311, source CAR 320, target CAR 321, and aggregate CAR 330.

In a first operation, source CAR 320 exchanges communication data with UE 301 over source LTE eNodeB 310 using ICN routing and UE 301 begins to move and initiate a handover, as indicated by the solid arrow. In a second operation, once UE 301 begins to move and initiate a UE handover to target LTE eNodeB 311, target LTE eNodeB 311 receives a handover request message from UE 401 indicating a source LTE eNodeB identifier and a UE identifier.

In a third operation, target CAR 321 receives a notification of the UE handover from target LTE eNodeB 311 indicating the source LTE eNodeB identifier and the UE identifier. For example, UE 301 might transfer a handover request message to target LTE eNodeB 311 indicating a cell identifier of source LTE eNodeB 310 and a UE IP address for UE 301. Target LTE eNodeB 311 would then transfer the source cell identifier and the UE IP address to Target CAR 321.

Target CAR 321 may maintain a data structure relating source cell identifiers to a default CAR. Therefore, in a fourth operation, target CAR 321 determines source CAR 320 associated with source LTE eNodeB 310 based on the source cell identifier of source LTE eNodeB 310. In a fifth operation, target CAR 321 may also request the communication data from source CAR 320 based on the UE identifier, such as the received UE IP address.

At this point in the process, target CAR 321 receives all subsequent communication data for UE 301 forwarded from source CAR 320. In a sixth operation, target CAR 321 also receives subsequent data from aggregate CAR 330 which may now be transferring data to target CAR 321 instead of source CAR 320. Advantageously, this allows for there to be no changes in the X2 interface or S1 interface while extracting communication data from both source CAR 320 and aggregate CAR 330.

Figure 4:
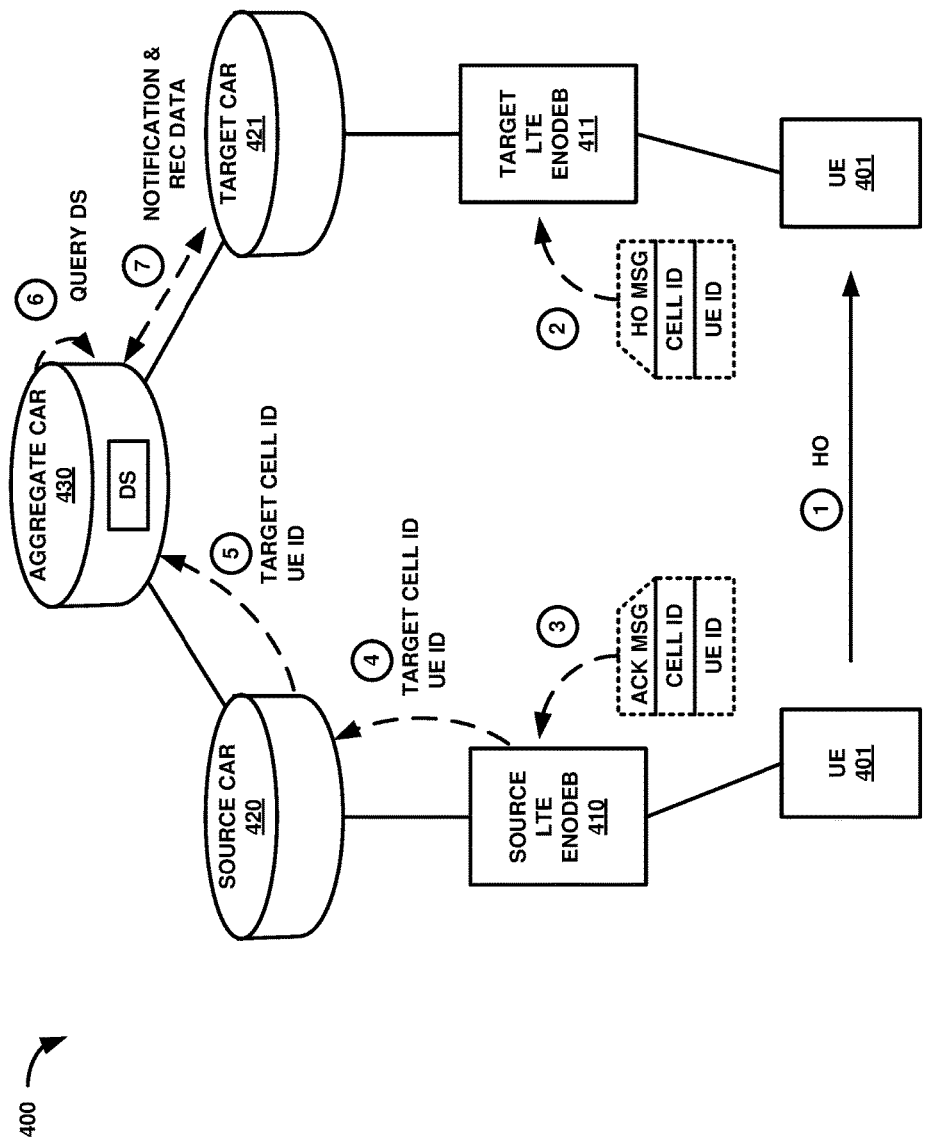
FIG. 4 illustrates an alternative LTE communication system including a plurality of CARs to facilitate a UE handover.

FIG. 4 illustrates alternative LTE communication system 400 including a plurality of CARs to facilitate a UE handover. LTE communication system 400 is an example of wireless communication system 100, although wireless communication system 100 may use alternative configurations and operations. LTE communication system 400 comprises UE 401, source LTE eNodeB 410, target LTE eNodeB 411, source CAR 420, target CAR 421, and aggregate CAR 430.

In a first operation, source CAR 420 exchanges communication data with UE 401 over source LTE eNodeB 410 using ICN routing and UE 401 begins to move and initiate a handover, as indicated by the solid arrow. In a second operation, once UE 401 begins to move and initiate a UE handover to target LTE eNodeB 411, target LTE eNodeB 411 receives a handover request message from UE 401.

In a third operation, target LTE eNodeB 411 sends a handover request acknowledgement message to source LTE eNodeB 410. In a fourth operation, source LTE eNodeB 410 transfers the notification of the UE handover indicating a target cell identifier and the UE identifier to source CAR 420. In a fifth operation, source CAR 420 transfers the notification of the UE handover to aggregate CAR 430 indicating the target cell identifier and a UE identifier.

Aggregate CAR 430 may maintain a data structure relating cell identifiers to a default CAR. Therefore, in a sixth operation, aggregate CAR 430 determines target CAR 421 associated with target LTE eNodeB 411 based on the cell identifier of target LTE eNodeB 411. In a seventh operation, target CAR 421 receives the notification of the UE handover from aggregate CAR 430 and receives subsequent communication data for UE 401 aggregate CAR 430. Advantageously, this allows for there to be no changes in the X2 interface or S1 interface and no need to maintain multiple data structures in local CARs, such as target CAR 421.

Figure 5:
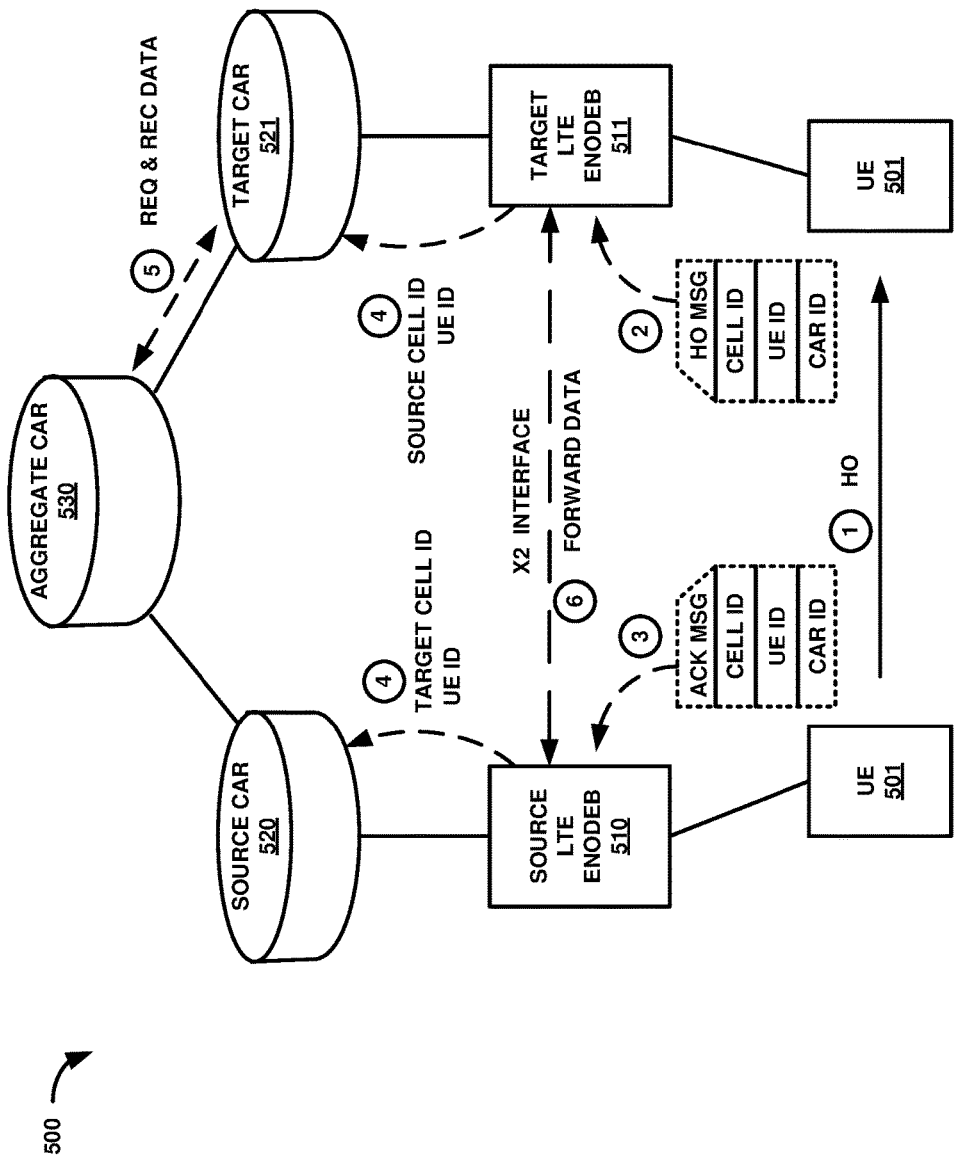
FIG. 5 illustrates an alternative LTE communication system including a plurality of CARs to facilitate a UE handover.

FIG. 5 illustrates an alternative LTE communication system 500 including a plurality of CARs to facilitate a UE handover. LTE communication system 500 is an example of wireless communication system 100, LTE communication system 300, although wireless communication system 100 may use alternative configurations and operations. LTE communication system 500 comprises UE 501, source LTE eNodeB 510, target LTE eNodeB 511, source CAR 520, target CAR 521, and aggregate CAR 530.

In a first operation, source CAR 520 exchanges communication data with UE 501 over source LTE eNodeB 510 using ICN routing and UE 501 begins to move and initiate a handover, as indicated by the solid arrow. In a second operation, once UE 501 begins to move and initiate a UE handover to target LTE eNodeB 511, target LTE eNodeB 511 receives a handover request message indicating a source LTE eNodeB identifier, a UE identifier, and a source CAR identifier. In a third operation, target LTE eNodeB 511 sends a handover request acknowledgement message to source LTE eNodeB 510 indicating a target LTE eNodeB identifier, a UE identifier, and a target CAR identifier.

In a fourth operation, source LTE eNodeB 510 transfers the notification of the UE handover indicating a target CAR identifier and a UE identifier to source CAR 520, and target LTE eNodeB 511 transfers the notification of the UE handover indicating a source CAR identifier and a UE identifier to target CAR 521. Source LTE eNodeB 510 and target LTE eNodeB 511 may also exchange additional information elements, such as a sequence number of the last packet received, a content name, and a prefix for UE 501. In this example, target LTE eNodeB 511 and source LTE eNodeB 510 exchange CAR identifiers and other information elements over an X2 interface link. However, other interface links may be used, such an S1 interface link.

In a fifth operation, target CAR 521 requests and receives subsequent communication data for UE 501 from aggregate CAR 530 based on the source CAR identifier and the UE identifier. Also, in a sixth operation, target CAR 521 may receive forwarded packets from source CAR 520 over the X2 interface using source LTE eNodeB 510 and target LTE eNodeB 511. Advantageously, this example embodiment allows source LTE eNodeB 510 to use the X2 interface to forward packets to target LTE eNodeB 511 until the transition of packet forwarding from aggregate CAR 530 to target CAR 521 is completed.

Figure 6:
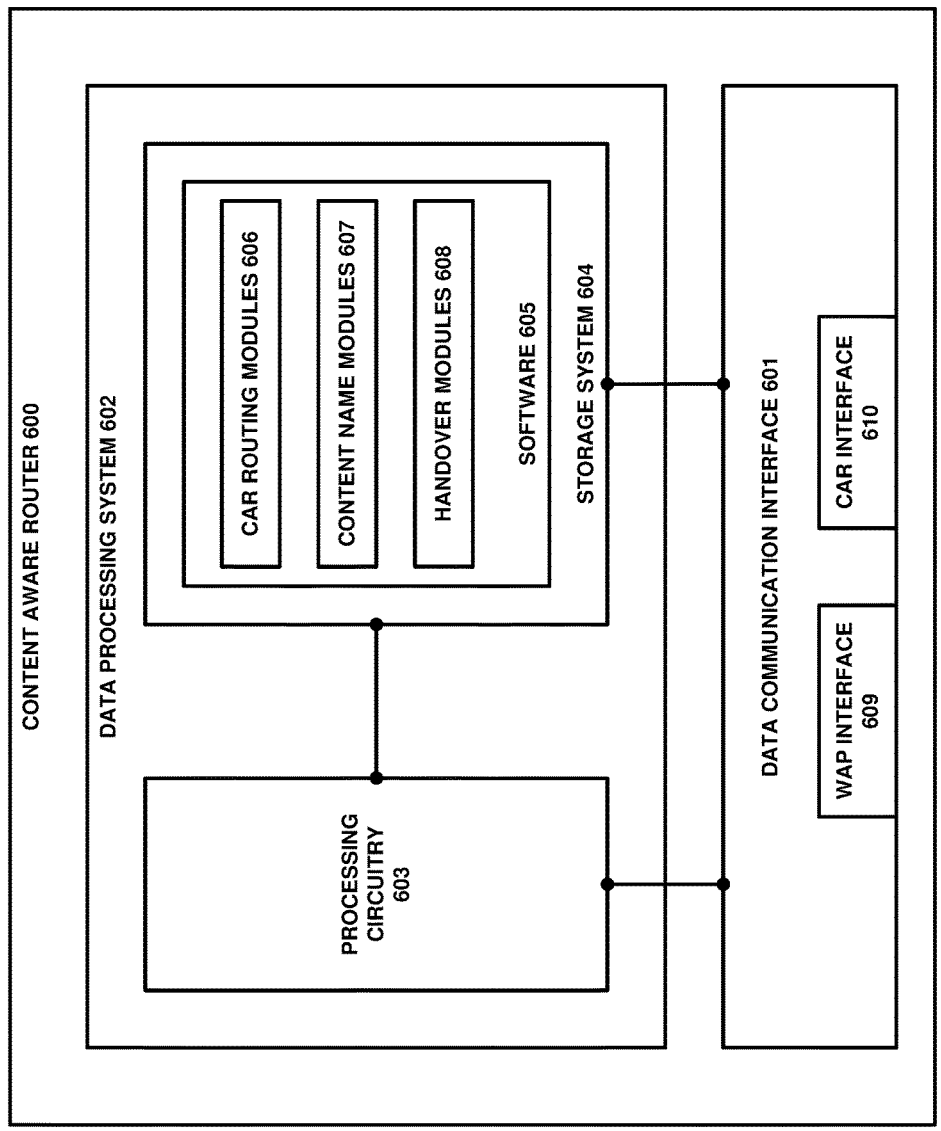
FIG. 6 illustrates a CAR to facilitate a UE handover.

FIG. 6 illustrates CAR 600 to facilitate a UE handover. CAR 600 is an example of CARs 120-121, CARs 320-321, CARs 420-421, and CARs 520-521 although wireless CARs 120-121, CARs 320-321, CARs 420-421, and CARs 520-521, and CAR 600 may use alternative configurations and operations. CAR 600 comprises data communication interface 601 and data processing system 602. Data communication interface 601 comprises wireless access point interface 609 and CAR interface 610. Data processing system 602 comprises processing circuitry 603 and storage system 604. Storage system 604 stores software 605. Software 605 includes respective software modules 606-608.

Wireless access point interface 609 comprises communication components, such as antennas, ports, amplifiers, filters, modulators, digital signal processors, bus interfaces, memory, software, and the like. Wireless access point interface 609 exchanges communication data with a wireless access point using ICN routing. CAR interface 610 may comprise wireless and/or wireline communication components, such as ports, bus interfaces, digital signal processors, antennas, amplifiers, filters, modulators, memory, software, and the like.

Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. CAR 600 may be centralized or distributed. All or portions of software modules 606-608 may be externally stored on one or more storage media, such as circuitry, discs, and the like. Some conventional aspects of CAR 600 are omitted for clarity, such as power supplies, enclosures, and the like.

When executed by processing circuitry 603, CAR routing module 606 directs circuitry 603 to exchange communication data for a UE using ICN routing. When executed by processing circuitry 603, content name module 607 directs circuitry 603 to request and receive communication data from a content provider based on a content name. When executed by processing circuitry 603, handover module 608 directs circuitry 603 to receive a notification of a UE handover. When executed by processing circuitry 603, handover module 608 also directs circuitry 603 to request communication data for a UE. When executed by processing circuitry 603, handover module 608 also directs circuitry 603 to receive subsequent data communication for the UE.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication system including a plurality of Content Aware Routers (CARs) to facilitate a User Equipment (UE) handover, the method comprising:

a source CAR exchanging communication data with a UE over a source wireless access point using Information Centric Network (ICN) routing wherein the source wireless access point serves a wireless network cell and wherein the UE has an Internet Protocol (IP) address;

a target CAR receiving a notification of the UE handover that indicates the UE IP address and the wireless network cell and responsively identifying the source CAR based on the wireless network cell;

the target CAR requesting subsequent communication data for the UE IP address from the source CAR and responsively receiving the subsequent communication data for the UE; and the target CAR exchanging the subsequent communication data with the UE over a target wireless access point using ICN routing.

2. The method of claim 1 further comprising the target CAR requesting and receiving a sequence number of a last packet of the communication data transferred to the UE IP address from the source CAR.

3. The method of claim 1 further comprising the target CAR requesting and receiving a content name of the communication data transferred to the UE IP address from the source CAR.

4. A wireless communication system includes a plurality of Content Aware Routers (CARs) to facilitate a User Equipment (UE) handover, the wireless communication system comprising:

a source CAR configured to exchange communication data with a UE over a source wireless access point using Information Centric Network (ICN) routing wherein the source wireless access point serves a wireless network cell and wherein the UE has an Internet Protocol (IP) address;

a target CAR configured to receive a notification of the UE handover that indicates the UE IP address and the wireless network cell and responsively identifying the source CAR based on the wireless network cell;

the target CAR configured to request subsequent communication data for the UE IP address from the source CAR and responsively receive subsequent communication data for the UE; and the target CAR is configured to exchange the subsequent communication data with the UE over a target wireless access point using ICN routing.

5. The wireless communication system of claim 4 further comprising the target CAR configured to request and receive a sequence number of a last packet of the communication data transferred to the UE IP address from the source CAR.

6. The wireless communication system of claim 4 further comprising the target CAR configured to request and receive a content name of the communication data transferred to the UE IP address from the source CAR.

* * * * *